UNITED STATES PATENT OFFICE.

JAMES DAVIS AND JOSHUA McKELVEY, OF PAWTUCKET, RHODE ISLAND.

IMPROVEMENT IN TANNING.

Specification forming part of Letters Patent No. 60,701, dated January 1, 1867.

*To all whom it may concern:*

Be it known that we, JAMES DAVIS and JOSHUA McKELVEY, of Pawtucket, in the county of Providence and State of Rhode Island, have invented a new and useful Improvement in the Process of Tanning; and we do hereby declare that the following is a description of our invention sufficient to enable those skilled in the art to practice it.

The object of this invention is to enable the process of tanning to be carried on with the substitution of cheap imported forms of tannin, such as gambier, for the expensive extract of tannin from oak-bark, and with a great saving of time, by making use of certain other ingredients, resulting in the production of leather equal in quality and appearance to the best oak-bark-tanned leather.

The ingredients which we make use of in the practice of our process are five in number, in addition to water used for solution and dilution thereof, and as a vehicle therefor, and are as follows: First, gambier or terra-japonica, catechu, kino, &c.; second, Glauber's salts, or sulphate of soda, sal-soda, or subcarbonate of soda; fourth, oil of vitriol, or sulphuric acid; fifth, chalk or whiting.

To illustrate the manner of using those ingredients, both as to the proportionate quantity of each and the time and manner of their application, we will, as an example, state how under this process we proceed to tan, say, thirty ox-hides, or, say, three thousand pounds of large, heavy green hides. For this quantity of hides a vat of four feet wide by four feet deep and eight feet long will be convenient, and should be filled about three-fourths full of water. Take enough of this water to dissolve about three hundred and twenty pounds of gambier, and strain off the insoluble parts. Then add to this mixture about twenty pounds of sulphate of soda and ten pounds of sal-soda, straining off the insoluble parts, if any, and add the mixture to the contents of the tank, stirring it well into the water, after which add about ten pounds of sulphuric acid, mixing it well with the contents of the tank. The hides are then placed in the tank, and are handled therein for two days, as any green pack is usually handled, after which the tanning-liquor in the tank is strengthened once per week for six weeks, and the hides are handled each day or every other day during that time.

The strengthening-liquor, to be added, as before mentioned, each week except the last, is prepared by dissolving and mixing, as before directed, about fifty pounds of gambier, one and one-half pound of sulphuric acid, four pounds of sulphate of soda, and one pound of sal-soda. The strengthening-liquor to be added the last week is prepared by substituting for the sulphuric acid about ten pounds of whiting or chalk, and the leather should remain in the vat for three days after adding this last mixture, handling it each of said days, at the end of which the leather is ready to be taken out and dried or curried.

The sulphuric acid acts on the hide to open its pores, so that it readily and quickly receives the tannic acid obtained from the gambier. The Glauber's salts cleanses or purges the hides from impurities, and, unlike common salt, does not render the leather hard or absorb moisture from the atmosphere. The sal-soda plumps or thickens the leather, and renders it soft and tough; and the whiting or chalk neutralizes the sulphuric acid remaining in the leather, which acid, though useful in its operation on the hides in assisting to change them into leather, has a tendency to make the leather hard and liable to crack and to decay.

All hides tanned by this process should be prepared for tanning in the same way that hides are prepared for the ordinary tanning with bark.

The proportions of ingredients named will be used for any kind of hides or skins; but the time required to complete the tanning process will vary from fifteen days to six weeks, according to the thickness of the material to be tanned—calf-skins requiring fifteen days, upper-leather twenty days, harness-leather thirty days, and belt and sole leather forty-five days. The special example given illustrates the treatment of heavy hides in tanning them into sole or belt leather.

We claim—

The described improvement in the process of tanning.

JAMES DAVIS.
     JOSHUA McKELVEY.

Witnesses:
 ROYAL LEE,
 GEO. A. CARPENTER.